Patented Aug. 11, 1953

2,648,660

UNITED STATES PATENT OFFICE 2,648,660

PROCESS FOR THE PREPARATION OF DIAZO AMINO COMPOUNDS AND WATER-INSOLUBLE AZO DYESTUFFS ON FIBERS

Robert Lazare Lantz, Paris, France, assignor to Compagnie Francaise des Matieres Colorantes S. A. R. L., Paris, France, a company of France No Drawing. Application March 20, 1951, Serial No. 216,665. In France March 24, 1950

7 Claims. (Cl. 260—140)

This invention relates to the preparation of diazo-amino compounds and especially to those diazo-amino compounds which are suitable as intermediates in the preparation of insoluble azo-dyestuffs.

It is known that the preparation on fibres of insoluble dyestuffs has been effected by coupling a diazo compound with a coupling component, these being introduced separately. An important improvement in this method has been brought about by introducing the two products together on the fibre by means of a single solution but, to prevent their spontaneous coupling, the structure of the first of them has been modified so that it may only couple after having been transformed by a suitable treatment, which it is made to undergo on the fibre. The most used modification of the diazo compound is its transformation into a diazo amino compound. The application of this process to diazo compounds derived from aromatic diamines, of which one of the amino groups is secondary, does not appear to have obtained a great success in spite of the research effected to bring it about.

Now in accordance with the present invention it has been found that there can easily be obtained on the fibre or on any other support, dyestuffs deriving from diazo compounds obtained from aromatic diamines having one secondary amino group by using the corresponding diazo amino derivatives, sulphonated on the secondary nitrogen. These diazo amino compounds can be represented by the following formula

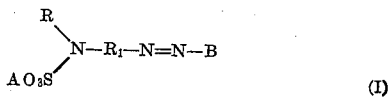

(I)

wherein

A represents a cation conferring solubility in water,

R represents a hydrocarbon radical which may be an alkyl or aryl group, for example—

R₁ represents an arylene group which may be substituted,

B represents the residue of a primary or secondary organic amine.

In this latter, the group or groups which substitute the nitrogen atom may be, for example aliphatic, aromatic, aryl aliphatic, alicyclic or heterocyclic groups and may together with the nitrogen atom, constitute a closed ring. Where B represents the residue of a primary amine there will be one hydrogen atom attached to the nitrogen atom.

These new diazo amino derivatives allow of obtaining azo dyestuffs on the fibre or on any other support by application on the latter with any coupling component, preferably in alkaline solution, then by suitably lowering the pH which brings about coupling and the elimination of the —SO₃H group attached to the secondary nitrogen. In certain cases there is an advantage in effecting these two reactions separately by lowering the pH in two successive stages.

The diazo amino derivatives of general Formula I used in accordance with the invention can be prepared by causing a diazo compound of the formula

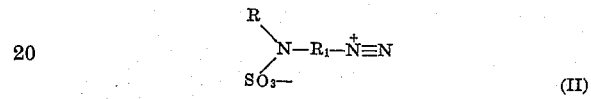

(II)

to react on an organic amine (stabilising amine) having at least one unsubstituted hydrogen atom, said diazo compound of general Formula II being derived from an aromatic diamine of which one amino group is secondary and substituted by a sulphonic acid group. In Formula II R and R₁ have the same significance as in Formula I.

The diazo compounds of Formula II can be considered as internal salts or amphoteric ions. They can be prepared according to the process described in British Patent No. 611,320, that is to say, by diazotization of an aromatic diamine of which the two amino groups are substituted by a sulphonic group one of them also carrying an organic radical. The most interesting of these compounds are those which do not carry substituents having solubilising properties, such as SO₃H or CO₂H or OH, other than the SO₃— group connected to the nitrogen of the secondary amino group. Amongst these can be mentioned, by way of example, the internal salts of N-phenyl-4-diazo benzenesulphamic acid, N-4'-methoxyphenyl-4-diazo benzenesulphamic acid, N-phenyl-3-methoxy-4-diazo benzenesulphamic acid, N-4'-methylphenyl-4-diazo benzenesulphamic acid, N-2'-methylphenyl-4-diazo benzenesulphamic acid, N-2'-methoxy-4-diazo benzenesulphamic acid, N-methyl-4-diazo benzenesulphamic acid, N-methyl-3-diazo-6-methyl benzenesulphamic acid.

Amongst the organic amines which may be used for the preparation of derivatives of Formula I can be cited by way of example, dimethylamine, diethylamine, dibutylamine, monomethyl-amine, monoethylamine, aniline, o-toluidine, methyl aniline, morpholine, cyclohexylamine, N-methyl-cyclohexylamine, piperidine.

The reaction between the diazo compound and the stabilising amine is advantageously effected in aqueous medium, neutral or alkaline and if necessary, in presence of a solvent miscible with water, such as alcohol. In most cases the product obtained is very soluble and should be extracted from the aqueous solution by salting out followed by filtration or even by evaporation of the solution. In the case where a solvent is used, the latter can be eliminated before the isolation of the final product.

Colourless bodies are thus obtained, which can usually be recrystallised from water or salt water. It may be remarked that these products have constitutions different from those of the diazo amino derivatives used, up to now, in industry for the preparation of azo dyestuffs on fibres, for they contain a solubilising group on the part of the molecule which couples, while the latter only carry such a solubilising group on the stabilising amine. Besides its solubilising properties the sulphonic acid group placed on the secondary amino group has a great aptitude for facilitating the coupling.

The coupling components capable of being combined with the diazo amino derivatives in accordance with the invention are principally those which are deprived of solubilising groups, such as —CO₂H and —SO₃H, which couple in a position vicinal to a phenolic or enolic hydroxyl group and which are used currently in industry for the production of azo dyestuffs on fibres. There can be mentioned by way of example the arylides and arylene diamides of 2-hydroxy naphthalene 3 - carboxylic acid, 2 - hydroxyanthracene-3-carboxylic acid, 2-hydroxycarbazole-3-carboxylic acid, 7:8-benzo-3'-hydroxycarbazole 2'-carboxylic acid, 3-hydroxy diphenylene oxide 2'-carboxylic acid, acylacetic acids and especially aceto acetic acid. Used with the diazo amino compounds before mentioned, themselves deprived of the solubilising groups mentioned above, they allow of obtaining particularly solid insoluble dyestuffs.

The diazoamino derivative and the coupling component can be introduced separately into the liquid or the paste which is used to impregnate the fibre or they may be mixed previously in the state of powder or of solution. In general there is added to them an alkaline product which can be involatile, for example caustic soda, or, on the contrary, volatile e. g. diethyl ethanolamine. In the second case there can be admixed moreover, a salt of an identical or different volatile base. It is sometimes necessary to add auxiliary products and ingredients, in particular those used in the practice of the coloration of fibres with insoluble azo dyestuffs such as for example thickeners, solvents, bodies having surface active properties, employed to wet and to disperse, hygroscopic agents, products employed to protect the dyestuff or its constituents against the action of prolonged steaming, etc.

In certain cases the colors are more intense when the impregnated fabric is steamed before development. The development can be carried out by any known means to diminish the pH of the products placed on a fibre or on a support such as steaming in an atmosphere of steam containing acetic acid, formic acid or these two acids, soaking or dipping in an acid solution, preferably hot and, in the case where the mixture placed on the fibre contains a volatile base, accompanied or not by a salt of a volatile base, steaming without acid or heating. One of the foregoing steamings or heatings can also be combined with soaking or dipping, these two operations being often able both to be very rapidly effected.

The new process forming the object of the invention is particularly important for the coloration of natural or regenerated cellulose and in particular for the printing of fabrics constituted by these fibres.

The following examples illustrate the present invention, Examples 1 to 4 relating to the preparation of the new diazo amino derivatives and Examples 5 to 9 relating to the use of these derivatives.

*Example 1*

To 300 parts by volume of an aqueous solution cooled to 0° C. and agitated, containing 44 parts of diethylamine and 11 parts of sodium carbonate, are added 30.5 parts of the internal salt of N-4'-methoxyphenyl-4-diazo benzenesulphamic acid prepared according to the British specification No. 611,320. To the solution obtained there is added an equal volume of a 15% solution of common salt. A crystalline precipitate is produced which is filtered at 0° C. and washed with a 7.5% salt solution also cooled to 0° C. There is thus obtained the diazo amino derivative of the formula

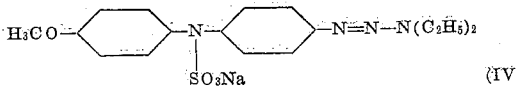

After recrystallisation in salt water made alkaline with sodium carbonate the product occurs in the form of colorless needles.

Diazo amino derivatives of similar constitution may be made by replacing the diethylamine by equivalent amounts of piperidine or morpholine and by modifying the conditions of dilution and salting out at the moment of precipitation.

*Example 2*

This is carried out as in the foregoing example by replacing the diethylamine by 52 parts of piperidine and the internal salt of N-4'-methoxyphenyl-4-diazo benzenesulphamic acid by 27.5 parts of the internal salt of N-phenyl-4-diazo-benzenesulphamic acid.

The final product is precipitated from the reaction medium without having need to dilute or salt it. There is thus obtained a product occurring in the form of colorless needles and of the formula

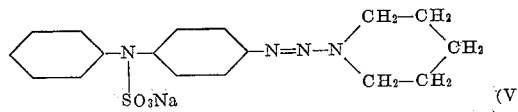

Bodies of similar constitution are obtained by replacing the piperidine with equivalent quantities of dimethylamine, diethylamine, morpholine or dibutylamine.

*Example 3*

A solution diluted to 300 parts by volume containing 27.5 parts of the internal salt of N-phenyl-4-diazo benzenesulfamic acid, 63 parts of monomethyl aniline, 10.5 parts of sodium carbonate and 75 parts by volume of alcohol is agitated for 2 hours at 5° C. The alcohol and the excess of monomethyl aniline is driven off in steam.

On cooling the diazo amino derivative of the formula crystallises

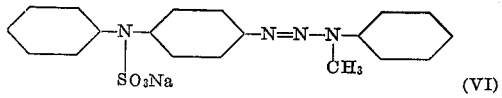

(VI)

By proceeding on similar lines but replacing the monomethylaniline by equivalent quantities of aniline or o-toluidine products of analogous constitution have been obtained.

*Example 4*

To a dilute aqueous solution cooled to 5° C. and containing, in 100 parts by volume, 44 parts of diethylamine and 12 parts of sodium carbonate, there is added 21.3 parts of the internal salt of N-methyl-4-diazo benzenesulphamic acid. It is salted out at the end of two hours with 7.5 parts of salt and filtered at 20° C.

There is thus obtained a precipitate of colorless needles and constituted by a product of formula,

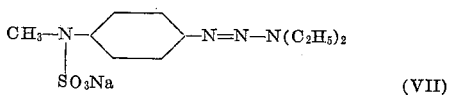

(VII)

*Example 5*

A cotton fabric is printed with the following color.

| | G. |
|---|---|
| Diazo amino derivative of Formula IV above (Example 1) resulting from the condensation of the internal salt of N-4'-methoxyphenyl-4-diazo benzenesulphamic acid with diethylamine | 8.0 |
| (2-hydroxy-3-naphthoyl)-aminobenzene | 5.8 |
| Solution of caustic soda of 400 g. per litre | 27.0 |
| Amidon thickener and water | 959.2 |
| | 1000.0 |

The printed fabric is dried then steamed for 5 minutes in steam containing formic acid or for 12 minutes in steam containing acetic acid, after which it is soaped in the usual manner. There is obtained a blue print.

Similar results are obtained by using in place of the foregoing diazo amino compound equivalent quantities of those obtained by the condensation of the same internal salt with dimethylamine, morpholine or aniline.

*Example 6*

A cotton fabric is printed with the following color:

| | G. |
|---|---|
| Diazo amino derivative made by Example 2 (Formula V) resulting from the condensation of the internal salt of N-phenyl-4-diazo benzenesulphamic acid with piperidine | 21.0 |
| (2-hydroxy-3-naphthoyl)-aminobenzene | 14.2 |
| Solution of caustic soda of 400 g. per litre | 38.0 |
| Water and amidon thickener | 926.8 |
| | 1000.0 |

The printed fabric was dried, then steamed ten minutes in steam containing acetic acid or three minutes in steam containing formic acid. Reddish blue designs were thus obtained.

Similar prints were obtained by replacing the diazo amino derivative by those obtained by the condensation of the internal salt used in its preparation, with dimethylamine, diethylamine, dibutylamine, piperidine or morpholine.

*Example 7*

A fabric printed as in Example 5 was steamed for one minute in steam containing acetic acid then passed for 30 seconds into a bath heated to 80° C. containing 70 g. of sulphuric acid and 40 g. of anhydrous sodium sulphate per litre. It was immediately rinsed and soaped in the usual manner. There was obtained thus a blue print.

*Example 8*

A cotton fabric was printed with the following color:

| | G. |
|---|---|
| Diazo amino derivative resulting from condensation of the internal salt of N-4'-methoxyphenyl-4-diazo benzenesulphamic acid | 8.0 |
| (2-hydroxy-3-naphthoyl)-aminobenzene | 5.8 |
| 2-ethoxy-ethanol | 30.0 |
| 2-diethylamino-ethanol | 60.0 |
| Water and amidon thickener | 896.2 |
| | 1000.0 |

The fabric thus printed was then dried and steamed for five minutes in neutral steam, then passed for 30 seconds into a bath heated to 80° C. containing 70 g. of sulphuric acid and 40 g. of anhydrous sodium sulphate per litre, after which it was immediately rinsed. After the usual soaping a blue print was obtained.

*Example 9*

A cotton fabric was printed with the following color:

| | G. |
|---|---|
| Diazo amino derivative resulting from the condensation of the internal salt of N-4'-methoxyphenyl-4-diazo benzenesulphamic acid with diethylamine | 8.0 |
| 1-(2'-hydroxy-3-naphthoyl) amino-4-chlorobenzene | 6.6 |
| 2-Ethoxy-ethanol | 30.0 |
| 2-Diethylamino-ethanol | 100.0 |
| Ammonium sulphate | 22.4 |
| Water and amidon thickener | 833.0 |
| | 1000.0 |

The printed fabric was dried and then steamed for 30 minutes in neutral steam. Following rinsing and soaping in the usual manner a blue print was obtained.

I claim:

1. As a new product, a diazoamino compound of the general formula:

$$R-N-\underset{SO_2A}{\underset{|}{\bigcirc}}-N=N-B$$

wherein

A represents an atom of an alkali metal,
R represents a member selected from the group consisting of methyl, ethyl, phenyl and methoxyphenyl radicals, and
B represents the residue of a member of the group consisting of the primary and secondary amines.

2. As a new product, a diazoamino compound of the general formula:

$$H_3CO-\bigcirc-N-\underset{SO_3A}{\underset{|}{\bigcirc}}-N=N-B$$

wherein A represents an atom of an alkali metal and B represents the residue of a secondary amine.

3. As a new product, the diazoamino compound of the following formula:

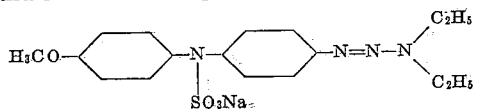

4. As a new product, the diazoamino compound of the following formula:

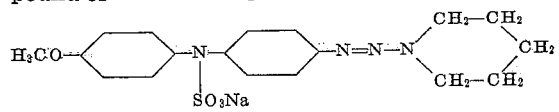

5. As a new product, the diazoamino compound of the following formula:

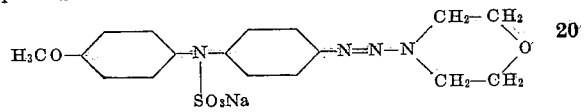

6. As a new product, the diazoamino compound of the following formula:

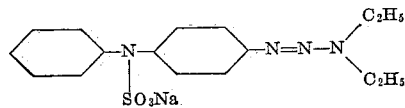

7. As a new product, the diazoamino compound of the following formula:

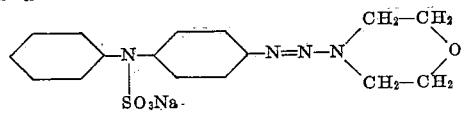

ROBERT LAZARE LANTZ.

References Cited in the file of this patent
UNITED STATES PATENTS

| Number | Name | Date |
| --- | --- | --- |
| 1,982,681 | Markush | Dec. 4, 1934 |
| 2,078,387 | Kern | Apr. 27, 1937 |
| 2,124,594 | Schmelzer | July 26, 1938 |
| 2,349,091 | Haddock | May 16, 1944 |
| 2,375,132 | Pizzarello | May 1, 1945 |
| 2,453,430 | Greig | Nov. 9, 1948 |

FOREIGN PATENTS

| Number | Country | Date |
| --- | --- | --- |
| 611,320 | Great Britain | Oct. 28, 1948 |

OTHER REFERENCES

Saunders, "The Aromatic Diazo Compounds," 2nd edition, 1949, pages 150, 158, 159.